2,999,021
PROCESS FOR TREATMENT OF FATS

Hjalmer E. Seestrom, William B. Guerrant, Jr., and Robert L. Campbell, Jr., Sherman, Tex., assignors to Anderson, Clayton & Company, Houston, Tex., a corporation of Delaware
No Drawing. Filed Apr. 27, 1960, Ser. No. 24,888
8 Claims. (Cl. 99—118)

The present invention relates to the treatment of fats by adding glycerol to the fats. The invention has particular reference to lard and its treatment to enhance its cake baking properties, and the description of the invention for the purpose of disclosure is directed primarily to lard; although, the invention applies to other fats, as mentioned later herein, all of which are encompassed within the invention. This application is a continuation-in-part for application Serial No. 677,775, filed August 12, 1957, now abandoned.

Lard is an excellent shortening for frying purposes and for making pies and the like; however, lard is not entirely satisfactory for baking cakes as cakes baked using lard have less volume than cakes baked using hydrogenated vegetable shortenings. Some in the art believe they have improved the cake baking properties of lard by processes which rearrange the glyceride molecules in the lard. One such patent in United States Patent Re. 23,499, reissued May 20, 1952, on the application of Robert J. Vanderwal and Leon A. Van Akkeren. Others in the art have treated lard to change the crystal habits of the triglycerides without changing the glyceride content or chemical composition of the lard in an effort to improve the cake baking properties of lard. The present invention is based upon the discovery that superior cake baking properties of lard are produced by what might be termed glycerine addition to lard, that is, treating the lard with a small amount of modification catalyst in the presence of a small amount of glycerine and promptly discontinuing the treatment upon completion of formation of diglycerides by the action of the glycerine with the triglycerides of the lard. This advantageously reduces the losses attendant other modification reactions and provides an equivalent product produced by higher catalyst concentrations without the losses. The treatment of lard should preferably be such that the lard has a specific diglyceride content of the order of about 5% to about 15% and preferably about 9% to 12% without changing the crystal properties or extensively rearranging the glyceride molecules of lard although other diglyceride concentrations are encompassed within the invention within the range of catalyst and glycerine previously mentioned.

It is therefore an object of the present invention to treat lard to improve its cake baking properties by adjusting the diglyceride content thereof with a minimum of losses.

Still a further object of the present invention is the provision of a process for modifying lard in which glycerine is chemically incorporated into the fat to produce a fat having an increased diglyceride content with a minimum of losses.

Still a further object of the present invention is the provision of a process for glycerine treatment of lard and other fats in which glycerine is chemically incorporated into the fat to produce a fat having from about 5% to about 15% diglyceride content.

Still a further object of the present invention is the provision of a process of treating lard so that it has improved cake baking properties in which losses accompanying previous processes of modifying lard are greatly reduced, for example, in some instances, the losses are reduced as much as approximately 50%.

It is yet a further object of the present invention to provide a process of treating lard with a small amount of a modification catalyst and a small amount of glycerine to increase its diglyceride content from about 5% to about 15%, and preferably from about 9% to about 12% and promptly discontinuing the process on completion of formation of diglycerides by the action of the glycerine with the triglycerides of the fat, such as lard.

Yet a further object of the present invention is the provision of a process of treating fats, such as lard, with from about 0.02% to about 1.0% modification catalyst in the presence of from about 0.3% to about 1.0% glycerol and promptly discontinuing the process on completion of formation of diglycerides by the action of the glycerol with the triglyceride of the fat, such as lard, thereby minimizing losses.

Other and further objects, features and advantages of the present invention will be apparent from the following description of presently preferred examples of the invention.

In modifying lard with a modification catalyst, for example, sodium methoxide, the fatty acids are redistributed and mono glycerides and diglycerides are formed. This reaction may be summarized as follows:

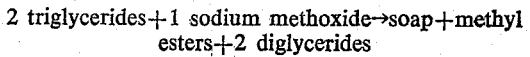

2 triglycerides+1 sodium methoxide→soap+methyl esters+2 diglycerides

Since the soap and methyl esters both are removed by further processing, an unavoidable loss accompanies this type of modification. On a weight basis, the magnitude of this loss is approximately 11% of the lard for each percentage of sodium methoxide used as catalyst. The diglycerides formed in the above reaction, however, are not removed and the differences in diglyceride concentration causes variations in samples of identical lard. For certain types of modified lard products, the presence of a substantial quantity of diglyceride is desirable, if not mandatory. While these diglycerides can be formed in situ by the use of a large quantity of catalyst, for example, sodium methoxide, the loss associated with this process renders the manufacturing almost prohibitively expensive. The present invention is directed to a method in which such losses are considerably reduced.

In treating fat, such as lard according to the invention the range of modification catalyst is from about 0.02% to about 1.0% and preferably from about 0.2% to about 0.5%. The range of glycerine is from about 0.3% to about 1.0% and preferably from about 0.4% to about 0.7%. If processing is performed outside of these ranges for catalyst and glycerine the advantages of the present invention are lost because of the high losses. All percentages given are by weight.

In one aspect of the present invention, lard is modified with a small amount of a catalyst, 0.3% sodium methoxide and a small amount of glycerine, 0.4%, which results in a product essentially equal to that produced by a large quantity of sodium methoxide, for example 0.7%–0.8%, The action of the glycerine portion of the catalyst with the triglyceride may be summarized as follows:

2 triglyceride + 1 glycerine → 3 diglycerides

This reaction is not accomplished by the loss of lard as soap as methyl esters, which is associated with the use of high concentrations of sodium methoxide catalyst, as previously noted.

Many modification catalysts may be used in the present process, for example, alkaline catalysts, such as sodium hydroxide, potassium hydroxide, sodium methoxide, sodium methylate, lithium hydroxide, calcium hydroxide, as well as others. In using these catalysts, small amounts of glycerine in the range previously mentioned are added and the temperature range may vary from about 15° C. to about 25° C. Preferably, anhydrous glycerine (99.8%) is used; however, it will be apparent from the following examples the glycerine does not necessarily have to be anhydrous glycerine and may be for example, 95% glycerine.

The following specific examples are given for purposes of illustration. As previously mentioned, all percentages given in the following examples are by weight. In all examples, the reaction was stopped immediately upon completion of the formation of diglycerides by the action of the glycerine on the triglyceride to avoid losses.

EXAMPLE I

In this example, prime steam lard, considered to be typical of that type of fat was modified by catalyst concentrations from 0.02% to 1.0% and 0.3% to 1.0% glycerine as the maximum range and 0.2% to 0.5% catalyst and 0.4% to 0.7% glycerine as the preferred range. The treatment was at a temperature of about 95° C. to 205° C. and continued for a time interval of from 46 to 60 minutes. Promptly upon completion of the formation of the diglycerides by the action of the glycerine on the triglycerides of the lard the modification reaction was stopped by deactivating the catalyst with water or phosphoric acid. After water washing and vacuum drying to remove soap, the product was deodorized to remove any unwanted materials, including methyl esters formed by the reaction of sodium methoxide.

Prior to modification the lard was filtered and deodorized to remove moisture, free fatty acids and peroxides known to deactivate the catalyst. An analyses of this lard is set forth in Table I.

Table I

| | Whole Lard | Components Separated Chromatographically | | |
|---|---|---|---|---|
| | | Triglyceride | Diglyceride | Monoglyceride |
| Iodine Value: | | | | |
| (actual) | 64.4 | | | |
| (calc.[1]) | 64.6 | 59.2 | 58.2 | 46.7 |
| Free Fatty Acid, Percent | 0.03 | | | |
| Peroxide No., me./kg. | 0 | | | |
| Moisture (Karl Fischer), Percent | 0.4 | | | |
| Percent Dilatometric Solids at: | | | | |
| 10° C | 28.2 | | | |
| 21° C | 21.0 | | | |
| 27° C | 14.3 | | | |
| 33° C | 4.2 | | | |
| 40° C | 1.9 | | | |
| Glyceride Components:[2] | | | | |
| Triglyceride | 95.84 | | | |
| Diglyceride | 3.79 | | | |
| Monoglyceride | 0.37 | | | |
| Fatty Acid Composition, Percent: | | | | |
| Myristic | 1.3 | 1.9 | | |
| Palmitic | 25.7 | 25.9 | 21.5 | 20.2 |
| Palmitoleic | 3.3 | 3.0 | | |
| Stearic | 12.2 | 13.6 | 20.2 | 15.9 |
| Oleic | 45.2 | 44.3 | 45.6 | 44.3 |
| Linoleic | 10.8 | 9.9 | 12.7 | 10.6 |
| Linolenic | 1.5 | 1.4 | | |
| Molecular Weight (calc.[1]) | 848.69 | 859.57 | 610.03 | 349.00 |

[1] Calculated on basis of fatty acid composition.
[2] Determined chromatographically.

The results of these tests are set forth in Table II.

Table II

| Sample Identification | Orig. Lard | 2 | | 3 | | 4 | | 5 | |
|---|---|---|---|---|---|---|---|---|---|
| Reaction Conditions: | | | | | | | | | |
| Lard Quantity, gms | | 1,500 | | 1,500 | | 1,500 | | 1,500 | |
| Sodium Hydroxide, Percent | | | | | | | | | |
| Sodium Hydroxide, gms | | | | | | | | | |
| Sodium Methoxide, Percent | | 0.2 | | 0.2 | | 0.2 | | 0.5 | |
| Sodium Methoxide, gms | | 3.0 | | 3.0 | | 3.0 | | 7.5 | |
| Anhydrous Glycerine, Percent | | None | | 0.4 | | 0.7 | | 0.4 | |
| Anhydrous Glycerine, gms | | | | 6.0 | | 10.5 | | 6.0 | |
| Temperature, °C | | 95 | | 95 | | 95 | | 95 | |
| Time, minutes | | 45 | | 45 | | 45 | | 45 | |
| | | As Mod. | As Deod. | As Mod. | As Deod. | As Mod. | As Deod. | As Mod. | As Deod. |
| Analytical Characteristics: | | | | | | | | | |
| Iodine Value | 64.4 | 64.2 | | 63.7 | | 63.8 | | 64.0 | |
| Percent Dilatometric Solids at— | | | | | | | | | |
| 50° F | 28.2 | 23.4 | 21.0 | 19.7 | 20.4 | 19.3 | 19.3 | 20.5 | 19.9 |
| 70° F | 21.0 | 11.1 | 9.5 | 10.5 | 10.7 | 9.5 | 10.4 | 10.4 | 10.3 |
| 80° F | 14.3 | 9.2 | 7.6 | 8.8 | 8.7 | 8.7 | 8.8 | 8.4 | 8.6 |
| 92° F | 4.2 | 5.6 | 4.4 | 5.4 | 5.3 | 5.1 | 5.3 | 4.9 | 5.1 |
| 104° F | 1.9 | 0.8 | 0.0 | 0.0 | 0.4 | 0.0 | 0.3 | 0.0 | 0.4 |
| Glyceride Compositions[1]— | | | | | | | | | |
| Triglyceride, Percent | 95.84 | 93.28 | 88.66 | 84.72 | 79.67 | 80.56 | 77.15 | 84.93 | 78.85 |
| Diglyceride, Percent | 3.79 | 5.83 | 11.07 | 14.65 | 19.28 | 18.15 | 21.57 | 13.93 | 19.18 |
| Monoglyceride, Percent | 0.37 | 0.89 | 0.27 | 0.65 | 1.05 | 1.24 | 1.28 | 1.14 | 1.97 |
| Theoretical Considerations— | | | | | | | | | |
| Soap Formed, Percent | | 1.10 | | 1.10 | | 1.10 | | 2.75 | |
| Methyl Esters Formed, Percent | | 1.07 | | 1.07 | | 1.07 | | 2.66 | |
| Process Loss, Percent | | 2.17 | | 2.17 | | 2.17 | | 5.41 | |
| Triglyceride, Percent | | | 90.34 | | 83.85 | | 79.45 | | 78.87 |
| Diglyceride, Percent | | | 9.44 | | 15.38 | | 19.27 | | 19.77 |
| Monoglyceride, Percent | | | 0.22 | | 0.77 | | 1.28 | | 1.36 |

See footnote at end of table.

*Table II*—Continued

| Sample Identification | 6 | 7 | 8 | 9 | 10 | 11 | 12 |
|---|---|---|---|---|---|---|---|
| Reaction Conditions: | | | | | | | |
| Lard Quantity, gms | 1,500 | 1,500 | 1,500 | 1,500 | 1,500 | 1,500 | 1,500 |
| Sodium Hydroxide, Percent | | | | | 0.02 | 0.02 | 0.02 |
| Sodium Hydroxide, gms | | | | | 0.30 | 0.30 | 0.30 |
| Sodium Methoxide, Percent | 0.5 | 1.0 | 1.0 | 1.0 | | | |
| Sodium Methoxide, gms | 7.5 | 15.0 | 15.0 | 15.0 | | | |
| Anhydrous Glycerine, Percent | 0.7 | None | 0.3 | 1.0 | None | 0.3 | 1.0 |
| Anhydrous Glycerine, gms | 10.5 | | 4.5 | 15.0 | | 4.5 | 15.0 |
| Temperature, °C | 95 | 95 | 95 | 95 | 205 | 205 | 205 |
| Time, minutes | 45 | 45 | 45 | 45 | 60 | 60 | 60 |

| | As Mod. | As Deod. | As Mod. | As Deod. | As Mod. | As Deod. | As Mod. | As Deod. | As Deod. | As Deod. | As Deod. |
|---|---|---|---|---|---|---|---|---|---|---|---|
| Analytical Characteristics: | | | | | | | | | | | |
| Iodine Value | 63.9 | | 64.1 | | 63.3 | | 63.4 | | 63.4 | 63.2 | 62.8 |
| Percent Dilatometric Solids at— | | | | | | | | | | | |
| 50° F | 18.5 | 18.4 | 14.1 | 14.4 | 15.7 | 16.0 | 18.7 | 19.1 | 26.2 | 26.3 | 23.6 |
| 70° F | 9.8 | 10.6 | 7.8 | 8.0 | 8.3 | 8.6 | 9.9 | 10.1 | 19.2 | 19.4 | 15.3 |
| 80° F | 8.2 | 8.4 | 6.4 | 6.5 | 6.8 | 6.9 | 7.8 | 8.1 | 13.1 | 12.0 | 8.2 |
| 92° F | 4.6 | 5.1 | 3.6 | 3.7 | 3.9 | 4.1 | 4.5 | 4.6 | 4.3 | 3.8 | 1.9 |
| 104° F | 0.0 | 0.0 | 0.0 | 0.0 | 0.0 | 0.0 | 0.0 | 0.0 | 1.9 | 1.8 | 0.8 |
| Glyceride Compositions[1]: | | | | | | | | | | | |
| Triglyceride, Percent | 83.00 | 72.30 | 85.21 | 77.78 | 88.77 | 77.97 | 85.38 | 75.10 | 87.66 | 85.37 | 72.86 |
| Diglyceride, Percent | 15.65 | 25.26 | 13.38 | 21.09 | 11.03 | 20.22 | 13.68 | 22.68 | 11.30 | 13.85 | 24.91 |
| Monoglyceride, Percent | 1.35 | 2.44 | 1.41 | 1.14 | 0.20 | 1.81 | 0.94 | 2.22 | 1.04 | 0.78 | 2.23 |
| Theoretical Considerations— | | | | | | | | | | | |
| Soap Formed, Percent | 5.50 | | 5.50 | | 5.50 | | 5.50 | | 0.15 | 0.15 | 0.15 |
| Methyl Esters Formed, Percent | 2.66 | | 5.33 | | 5.33 | | 5.33 | | | | |
| Process Loss, Percent | 5.41 | | 10.83 | | 10.83 | | 10.83 | | 0.15 | 0.15 | 0.15 |
| Triglyceride, Percent | | 74.84 | | 76.56 | | 72.72 | | 64.75 | 94.00 | 88.81 | 78.22 |
| Diglyceride, Percent | | 23.19 | | 21.75 | | 24.94 | | 31.15 | 5.90 | 10.83 | 20.34 |
| Monoglyceride, Percent | | 1.97 | | 1.69 | | 2.34 | | 4.10 | 0.10 | 0.36 | 1.44 |

[1] Determined by chromatographic separation.

From Table II, it is apparent that the preferred ranges of catalyst (0.2–0.5%) and glycerine (0.4–0.7%), an increase in diglycerides of 16–22% was realized. At the extreme ranges of 0.02–1.0% catalyst and 0.3–1.0% glycerine, the diglyceride content increase varied from 10–21%. These data show that by using 0.3–0.4% glycerine essentially the same diglyceride content can be obtained with as little as 0.2% catalyst as that produced by 1.0% catalyst, alone. Therefore, by incorporation of 0.3–0.4% glycerine, process losses can be expected to be reduced by 400%. All of the lard so processed improved its cake baking properties.

EXAMPLE II

The diglyceride content of the lard is adjusted in situ by utilizing a small quantity of glycerine and a catalyst which causes a change in the chemical composition of the lard. Table III shows the process of formation of diglycerides in situ and the performance of the finished shortening.

*Table III*

| Sample No | 1 | 2 | 3 | 4 | 5 | 6 | 7 | 8 | 9 |
|---|---|---|---|---|---|---|---|---|---|
| Percent Glycerine | 1.0 | 1.0 | 0.75 | 0.75 | 0.5 | 0.5 | 0.25 | 0.25 | 0 |
| Percent NaOH | 0.1 | 0.2 | 0.10 | 0.10 | 0.1 | 0.1 | 0.20 | 0.20 | 0 |
| Temperature, °C | 200 | 200 | 200 | 200 | 200 | 200 | 200 | 200 | 0 |
| Time, hrs | 1 | 2.5 | 1 | 4½ | 1 | 6 | 1¼ | 6 | 0 |
| Percent Diglycerides | 16.8 | 18.9 | 14.4 | 14.8 | 11.7 | 11.5 | 8.7 | 8.1 | 0 |
| Percent Monoglycerides | 2.5 | 2.2 | 2.4 | 1.0 | 1.6 | 1.2 | 1.0 | 1.0 | 0 |
| Pound Cake Volume (cc./lb.): | | | | | | | | | |
| High Sugar | 1,172 | 1,110 | 1,172 | 1,116 | 1,151 | 1,152 | 1,138 | 1,116 | 1,130 |
| Low Sugar | 909 | 1,078 | 1,039 | 1,075 | 1,073 | 985 | 1,080 | 1,131 | 1,007 |

The various conditions and percentages of Example II are given in Table III. It appears from Table III that better performance is obtained without extensive treatment of the lard and the preferred amount of diglyceride appears to be from about 9% to about 12%.

EXAMPLE III

Two 500-pound batch samples of lard shortening were prepared to provide an end product containing about 11% diglyceride. Batch No. 1 was prepared by adding 0.5% glycerine, 0.1% NaOH and heating at a temperature of 150°–170° C. for about four hours. At this time all of the glycerine had disappeared. Batch No. 2 was prepared by the addition of 0.5% glycerine, 0.2% NaOH and heating to 200° C. for five hours. The two batches were made into finished shortening in the usual manner. Batch 1, which was not extensively treated, performed better than batch No. 2 containing diglycerides which was more extensively treated and some rearrangement took place, as measured by cake volume.

*Table IV*

| Batch No | 1 | 2 |
|---|---|---|
| Percent Diglycerides in Base Stock | 9.6 | 11.5 |
| Bakery Type Cake Volume (cc.) after 6 Wks. Aging of Shortening | 1,397 | 1,352 |

EXAMPLE IV

The optimum amount of diglycerides may be formed in situ by the treatment of lard with large amounts of sodium methoxide. However, to prevent loss of expensive lard as soap and methyl esters, the use of a small amount of glycerine and a small amount of sodium methoxide is advantageous to obtain the preferred amount of diglycerides.

In this example, two identical 750-pound samples of prime steam lard were vacuum dried, filtered and processed in a pilot plant. The first sample was rearranged using 0.6% sodium methoxide. The second sample was glycerine treated using 0.3% sodium methoxide and 0.4% anhydrous glycerine. Both reactions were conducted at 80° C. for approximately ninety minutes. The reaction was then terminated with water and the soap was removed by washing. Approximately 100 pounds of the rearranged and glycerine-treated lard sample were hydrogenated, then bleached and deodorized in the usual way.

Analytical data and baking results for these lard products are given in Table V.

Table V

|  | Glycerine Treated Lard | Methoxide Modified Lard |
|---|---|---|
| Percent Glycerine | 0.4 | 0.0 |
| Percent Methoxide | 0.3 | 0.6 |
| Glyceride Analyses (after hydrogenation, bleaching and deodorization): |  |  |
| Percent Triglycerides | 88.0 | 90.7 |
| Percent Diglycerides | 10.8 | 7.9 |
| Percent Monoglycerides | 1.2 | 1.4 |
| Performance Properties of Finished Shortening 125% Sugar Dry Mix Cake Volume (cc./gm.) | 3.05 | 3.01 |
| Calculated Loss of Lard as Soap and Methyl Ester, percent | 3.3 | 6.6 |

A review of the data of Table V indicates that both treatments gave diglyceride concentrations in the preferred range and comparable performance, but less loss of lard by the glycerine treatment.

EXAMPLE V

In this example a large quantity, 40,100-pound batch of lard was glycerine treated using concentrations of 0.3% sodium methoxide and 0.4% anhydrous glycerine. The batch of lard was dried under vacuum by circulating through a dehydrator. When the lard was dry, it was transferred to a reaction vessel. Anhydrous glycerine, at a concentration of 0.4% was then added to the lard with a maximum of agitation. The temperature of the lard at the time of the glycerine addition was 79° C. Approximately one hour after the addition of glycerine, 110 pounds of sodium methoxide catalyst (0.3%) were added in slurry form. Five minutes after the catalyst addition, the color of the lard in the reaction vessel was observed to darken appreciably. The color, however, was not as dark as that generally encountered in a modification process than in the glycerine treatment process.

At the end of the reaction period of approximately one hour, forty-five minutes, the reaction was terminated by the addition of water. Soap formed by the deactivation of the catalyst was allowed to settle overnight. The clear lard above the surface of the soap was then water washed and centrifuged.

The yield in lard obtained by this procedure was 38,760 pounds and reflected a total process loss of 3.4%. The average loss from rearrangement of lard, using 0.30%–0.37% sodium methoxide catalyst, averages 3.0%–3.5% of the lard to rearrangement. Thus, the loss encountered during treatment with glycerine was no greater than the loss to be anticipated from the use of 0.30% sodium methoxide alone. Analysis of the product resulting from the glycerine addition treatment indicated it to be equivalent to that usually produced by 0.7%–0.8% sodium methoxide catalyst. This resulted in a savings of from about 2% to about 4% of the lard to modification for products normally requiring the use of a relatively high, that is about 0.6%–0.8%, sodium methoxide catalyst concentration. The glycerol added lard had a diglyceride content of about 10% and a triglyceride content of about 90%.

Samples of both lards modified were hydrogenated and deodorized in the usual manner. The product resulting from the hydrogenation of lard treated in the presence of glycerine as described had a diglyceride content of about 10%. Baking tests were then performed and it was found that the glycerine added lard was equal to that produced by the use of 0.6%–0.7% sodium methoxide.

EXAMPLE VI

In this example, glycerination of the triglyceride of prime steam lard was carried out by using the same sample of lard as used in the other examples and adding 0.5% glycerine and the catalyst. The glycerine was not anhydrous glycerine but was 95% glycerine. The catalyst was added in various ways, either as a slurry, or as a solid material. The amounts of catalyst that were added were related to .1% sodium hydroxide. For example, in Table VI, .28% potassium hydroxide is equivalent to .20% sodium hydroxide and .14% potassium hydroxide is equivalent to .10% sodium hydroxide. In all cases the free glycerine disappeared and diglycerides were formed during the first one-half hour of reaction time. The various conditions are set forth in the following table.

Table VI

|  | Catalyst | Conc. (Wt. percent) | Temp., °C. |
|---|---|---|---|
| 1 | NaOH | 0.10 | 200 |
| 2 | NaOH | 0.20 | 200 |
| 3 | KOH | 0.28 | 200 |
| 4 | KOH | 0.14 | 200 |
| 5 | KOH | 0.07 | 200 |
| 6 | KOH | 0.28 | 170 |
| 7 | KOH | 0.14 | 170 |
| 8 | Na$_2$CO$_3$ | 0.26 | 200 |
| 9 | NaOCH$_3$ | 0.26 | 200 |
| 10 | LiOH | 0.06 | 200 |
| 11 | Sodium Stearate | 0.80 | 200 |
| 12 | Ca(OH)$_2$ | 0.28 | 200 |

The glycerine added lard from the above table was entirely satisfactory for making, icing and the like.

EXAMPLE VII

In this example a 200 pound batch of lard was heated with 0.6 pound (0.3%) sodium methoxide and 0.8 pound (0.4%) anhydrous glycerine. The mixture was allowed to react within the range of temperatures of from 37° C. to 15° C. The temperature was lowered in increments of approximately 11° C. The reaction proceeded for 24 hours at each temperature. At the end of 24 hours the reaction was terminated by the introduction of carbon dioxide gas in an amount sufficient to convert the sodium methoxide to sodium carbonate. After neutralization, the soap and carbonates were removed by washing with water. After suitable operations well known to all experienced in the art of shortening manufacturing, an acceptable shortening was prepared comprising 70% glycerine treated lard and 30% cottonseed salad oil. A comparison of this shortening with a shortening including rearranged lard in the same proportions is set forth in the following Table VII.

Table VII

| Prepared Mix White Cake | Low Temperature Glycerine Treated Shortening | Sodium Methoxide Rearranged Shortening |
|---|---|---|
| Batter Gravity (g./cc.) | 0.85 | 0.77 |
| Cake Volume (cc.) | 2,160 | 2,170 |
| Specific Cake Volume (cc./gm.) | 3.22 | 3.24 |
| Cake Height (inches) | 3.5 | 3.8 |

| Household Test Recipe | Low Temperature Glycerine Treated Shortening | Hydrogenated Vegetable Oil Household Shortening |
|---|---|---|
| Batter Gravity (g./cc.) | 0.91 | 1.03 |
| Cake Volume (cc.) | 1,695 | 1,655 |
| Specific Cake Volume (cc./gm.) | 2.64 | 2.47 |
| Cake Height (inches) | 3.0 | 2.6 |

These data indicate that the shortening resulting from the low temperature glycerine addition process was equal to either the sodium methoxide rearranged product or to a high quality hydrogenated vegetable oil product.

As previously mentioned, the invention is also applicable to fats other than lard fats, such as vegetable fats. The following examples are given for this purpose.

EXAMPLE VIII

Using a manufacturing procedure the same as Example VII, 500 pounds of cottonseed oil were converted into an acceptable plastic shortening. In this example 1.3 pounds of sodium methoxide catalyst and 1.4 pounds of anhydrous glycerine were used. The shortening contained 1.1% mono-glycerides, 9.6% diglycerides and 89.3% triglycerides.

*Table VIII*

| Household Test Recipe | Fresh Samples | | Aged Samples (3 mo.) | |
|---|---|---|---|---|
| | Hydrogenated Vegetable Oil Household Shtg. | Low Temp. Glycerine Treated Shtg. | Hydrogenated Vegetable Oil Household Shtg. | Low Temp. Glycerine Treated Shtg. |
| Test: | | | | |
| Batter Gravity (g./cc.) | 0.91 | 0.88 | 0.83 | 0.93 |
| Cake Volume (cc.) | 2,200 | 2,200 | 2,088 | 2,100 |
| Specific Cake Volume (cc./lb.) | 1,410 | 1,410 | 1,350 | 1,373 |

It would appear that the low temperature glycerine treated product is at least equal to the high quality vegetable oil shortening used for comparison.

EXAMPLE IX

In this experiment a 200 pound blend of 30% tallow and 70% refined bleached soybean oil were treated in the presence of 0.6 pound (0.3%) of sodium methoxide and 1.4 pounds (0.7%) of anhydrous glycerine. The reaction was conducted in a stepwise manner, the terminal temperatures being 33° and 15° C. The temperature was lowered by approximately six degrees per day after a reaction time of 4 days. After the usual termination and washing procedures and rearranged fat was plasticized as shortening. The shortening had 1.0% monoglycerides, 11.6% diglycerides and 87.4% triglycerides. The following Table IX illustrates the improved cake baking properties of the glycerine treated shortening.

*Table IX*

| Household Test Recipe (High Sugar) | Low Temperature Glycerine Treated Shortening | Hydrogenated Vegetabel Oil Household Shortening |
|---|---|---|
| Batter Gravity | 0.95 | 1.02 |
| Specific Cake Volume | 1,280 | 1,220 |
| Cake Quality | 7.5 | 7.0 |

The low temperature glycerine modified product again appears at least equal to the high quality hydrogenated vegetable oil shortening used as control.

Thus, while the present invention is particularly suitable for treating lard to improve its cake baking properties, it is advantageously applicable to all fats and improves their cake baking properties.

The present invention therefore is well suited and adapted to cary out the objects and ends, and has the advantages mentioned as well as others inherent therein. Many changes in details, operating conditions and the like will occur to those skilled in the art which are encompassed within the spirit of the invention and the scope of the appended claims.

What is claimed is:

1. A process of treating fat comprising subjecting the fat to a modification reaction in the presence of from about 0.02% to about 1.0% of a modification catalyst and from about 0.3% to about 1.0% of glycerine, and promptly stopping the modification reaction upon completion of the formation of diglycerides by the action of the glycerine.

2. A process of treating lard comprising subjecting the lard to a modification reaction in the presence of from about 0.02% to about 1.0% of a modification catalyst and from about 0.3% to about 1.0% of glycerine, and promptly stopping the modification reaction upon completion of the formation of diglycerides by the action of the glycerine.

3. A process of treating lard to increase the diglcyceride portion thereof comprising, contacting the lard with from about 0.02% to about 1.0% of a modification catalyst in the presence of from about 0.1% to about 1.0% glycerine, heating the lard in contact with said modification catalyst and said glycerine at a temperature range of from about 15° C. to about 250° C., and promptly discontinuing said heating and the modification reaction upon completion of the formation of diglycerides by the action of the glycerine.

4. A process of treating shortening comprising subjecting the shortening to a modification reaction in the presence of from about 0.02% to about 1.0% modification catalyst and from about 0.3% to about 1.0% of glycerine, and promptly terminating the modification reaction upon completion of formation of diglycerides by the action of the glycerine.

5. A process of treating fat comprising, agitating the fat and from about 0.3% to about 1.0% glycerine together in the presence of from about 0.2% to about 1.0% of a catalytically-active compound selected from the group consisting of alkaline metal alcoholates and alkaline earth metal alcoholates at a temperature between from about 15° C. and 250° C., and promptly discontinuing the treatment upon completion of the formation of diglycerides by the action on the glycerine.

6. A process of treating lard comprising agitating the lard and from about 0.3% to about 1.0% glycerine together in the presence of from about 0.02% to about 1.0% of a catalytically-active compound selected from the group consisting of alkaline metal alcoholates and alkaline earth metal alcoholates at a temperature between from about 15° C. and about 250° C., and promptly discontinuing the treatment upon completion of the formation of diglycerides by the action of the glycerine.

7. A process of treating fat comprising subjecting the fat to a modification reaction in the presence of a modification catalyst in the range of from about 0.02% to about 1.0% and glycerine in the range of from about 0.3% to about 1.0%, the modification catalyst and glycerine being present within said ranges in amounts sufficient only to increase the diglyceride content of the fat to from about 5% to about 15%, and promptly discontinuing the modification reaction upon completion of the formation of diglycerides by the action of the glycerine.

8. A process of treating fat comprising subjecting the fat to a modification reaction in the presence of a modification catalyst in the range of from about 0.02% to about 1.0% and glycerine in the range of from about 0.3% to about 1.0%, the modification catalyst and glycerine being present within said ranges in amounts sufficient only to increase the diglyceride content of the fat to form about 9% to about 12%, and promptly discontinuing the modification reaction upon completion of the formation of diglycerides by the action of the glycerine.

(References on following page)

References Cited in the file of this patent

UNITED STATES PATENTS

| | | |
|---|---|---|
| 2,132,393 | Coith et al. | Oct. 11, 1938 |
| 2,132,406 | Epstein | Oct. 11, 1938 |
| 2,309,949 | Gooding | Feb. 2, 1943 |
| 2,626,952 | Lange et al. | Jan. 27, 1953 |
| 2,815,286 | Andre et al. | Dec. 3, 1957 |

OTHER REFERENCES

Feuge et al.: "Oil and Soap," vol. 23, pp. 259–264, 1946.

Bailey: "Industrial Oil and Fat Products," 2nd ed., Interscience Publishers, Inc., New York, 1951, pp. 828, 832, 836 and 837.

UNITED STATES PATENT OFFICE
CERTIFICATE OF CORRECTION

Patent No. 2,999,021            September 5, 1961

Hjalmer E. Seestrom et al.

It is hereby certified that error appears in the above numbered patent requiring correction and that the said Letters Patent should read as corrected below.

Column 3, line 15, for "25° C." read -- 250° C. --; column 8, line 34, for "making" read -- baking --; column 9, line 46, for "and" read -- the --; column 10, line 37, for "0.2%" read -- 0.02% --.

Signed and sealed this 27th day of March 1962.

(SEAL)
Attest:

ERNEST W. SWIDER            DAVID L. LADD
Attesting Officer            Commissioner of Patents